J. H. MILLER & L. RAAB.
COMBINED TABLE AND WRITING DESK.
APPLICATION FILED FEB. 3, 1913.
1,157,633.
Patented Oct. 19, 1915.
3 SHEETS—SHEET 1.
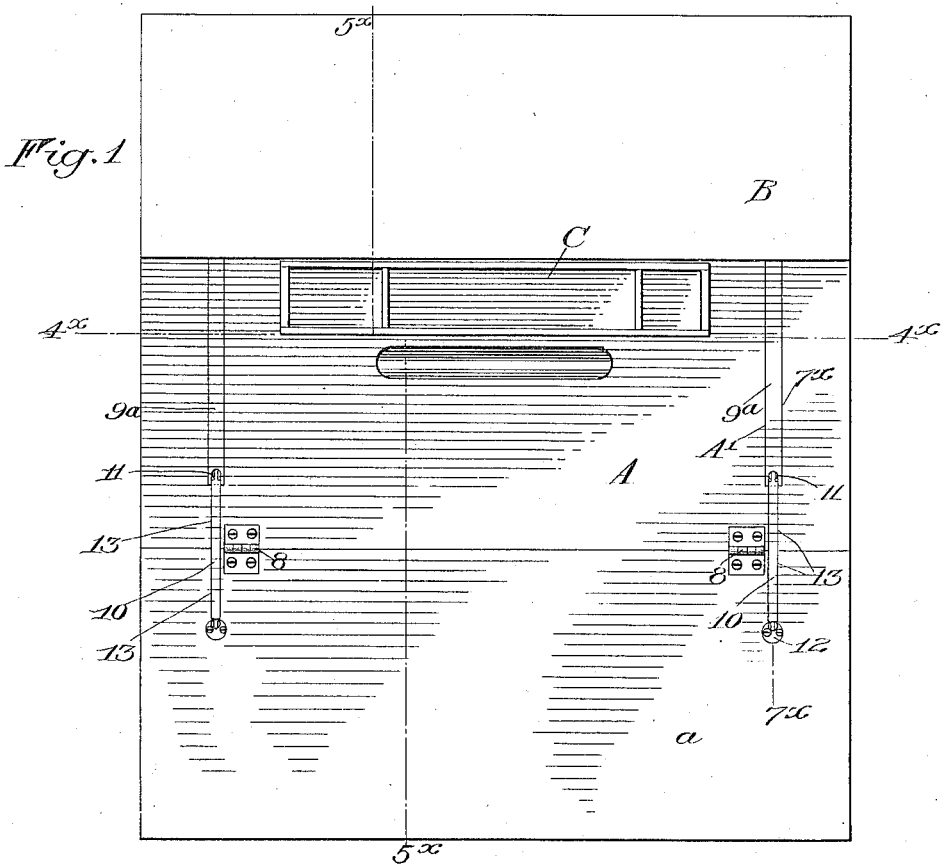
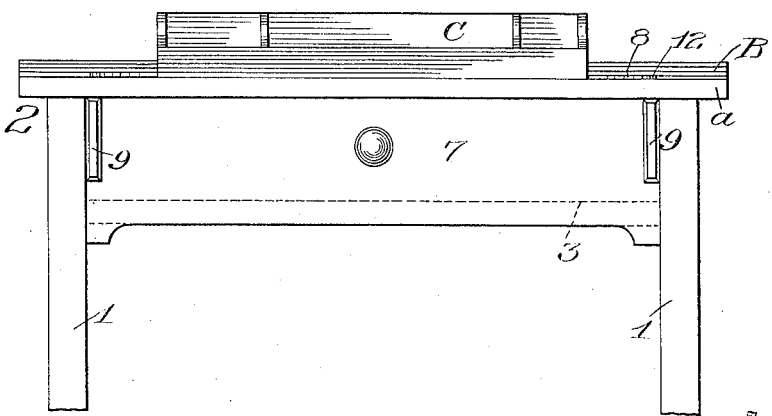
Witnesses
Walter B. Payne
Nelson H. Copp
Inventors
John H. Miller
Louis Raab
By
their Attorneys

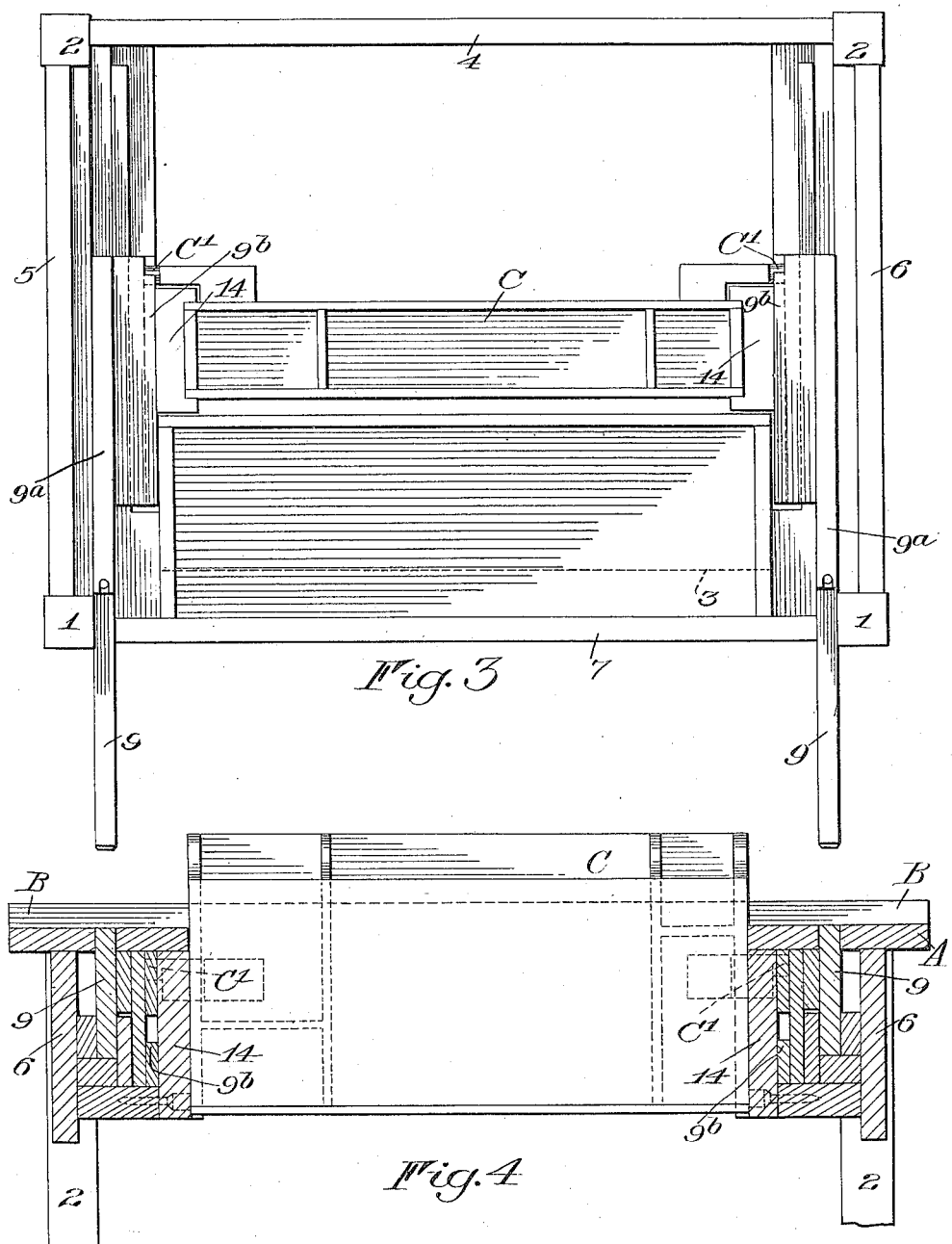

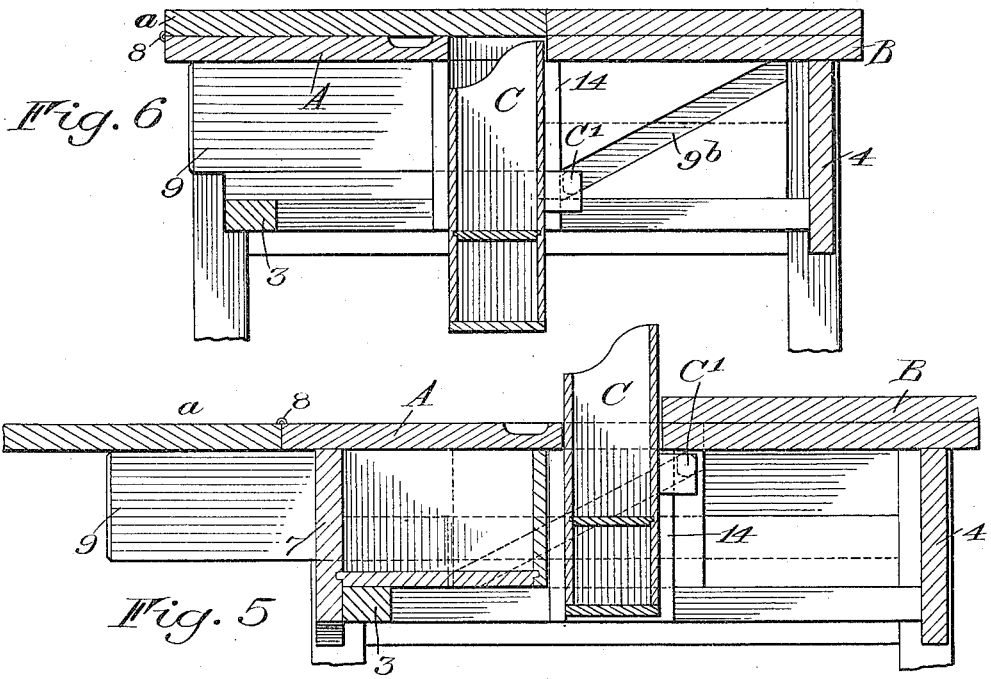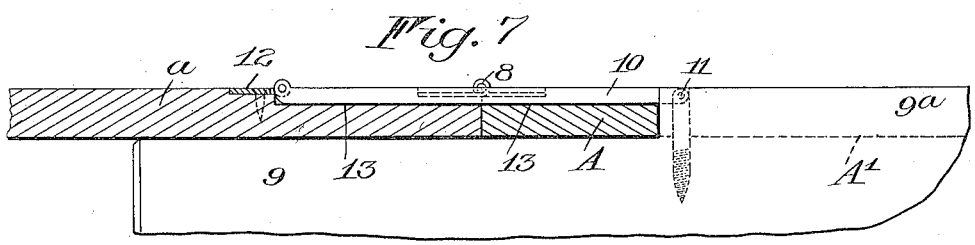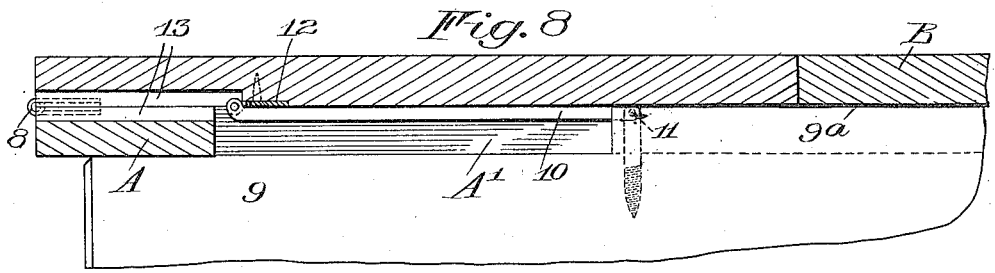

UNITED STATES PATENT OFFICE.

JOHN H. MILLER AND LOUIS RAAB, OF ROCHESTER, NEW YORK, ASSIGNORS TO MILLER CABINET COMPANY, OF ROCHESTER, NEW YORK, A CORPORATION OF NEW YORK.

COMBINED TABLE AND WRITING-DESK.

1,157,633.      Specification of Letters Patent.      Patented Oct. 19, 1915.

Application filed February 3, 1913. Serial No. 745,795.

*To all whom it may concern:*

Be it known that we, JOHN H. MILLER and LOUIS RAAB, of Rochester, in the county of Monroe and State of New York, have invented certain new and useful Improvements in Combined Tables and Writing-Desks; and we do hereby declare the following to be a full, clear, and exact description of the same, reference being had to the accompanying drawings, forming a part of this specification, and to the reference numerals marked thereon.

Our present invention has for its object to provide a new and improved article of furniture in the form of a convertible table-desk, the table having a movable top portion which may be adjusted to transform it into a writing desk, and it further comprehends the provision of adjustable slides or brackets, which automatically move into supporting position and a movable receptacle for containing the customary writing materials, which is automatically adjusted into an accessible position, when the desk lid is opened.

To these and other ends the invention consists in certain improvements and combinations of parts all as will be hereinafter more fully described, the novel features being pointed out in the claims at the end of the specification.

In the drawings: Figure 1 is a plan view of a table top constructed in accordance with our invention, the movable portion or desk lid being shown in the open position; Fig. 2 is a front elevation; Fig. 3 is a plan view showing the table frame with the table top removed; Fig. 4 is a sectional view taken on the line $4^x$—$4^x$ of Fig. 1; Fig. 5 is a sectional view taken on the line $5^x$—$5^x$ of Fig. 1; Fig. 6 is a similar sectional view, the parts however, being shown in the position which they occupy when the desk lid is in closed position, and Figs. 7 and 8 are enlarged detail sectional views taken along the line $7^x$—$7^x$ of Fig. 1, showing in detail the operating connection between the desk lid and the sliding supporting bracket.

Similar reference numerals in the several figures indicate the same parts.

In carrying out our invention, we have shown it as applied to a table frame which may be of the desired or any preferred construction, comprising the front and rear pairs of legs 1—1 and 2—2, which are connected respectively by the front and rear rails 3 and 4 and the two end rails 5 and 6. If desired, the front rail may be positioned, as shown in section in Fig. 5 and in dotted lines in Fig. 2, to accommodate the sliding drawer 7.

The convertible table top constructed in accordance with our invention is preferably rectangular in outline and of such dimensions that it overhangs the four sides of the frame. At its forward side the table top consists of the parts A and *a* connected at their outer edges, by hinges 8, so that the movable portion or leaf *a* may be folded either into the closed position shown in Figs. 6 and 8 or opened, as shown in Figs. 5 and 7 to form an extension or leaf adapting the structure to be used as a writing desk. The rear half of the table top is preferably constructed of the portion B of single thickness, equal to the combined thickness of the parts A and *a* so that when the latter is closed, the table top will be a flat smooth surface, unbroken with the exception of the joint between the edges of the leaf *a* and the part B.

In order to support the desk lid in open position, we provided, preferably at each end of the table, sliding brackets 9, which are simultaneously projected from a position beneath the table top as shown in Fig. 6, to the outward position shown in Figs. 3 and 5, as the operator revolves the lid *a* from closed to open position. These brackets are mounted in suitable guides on the end rails 5 and 6, their forward ends lying below the portion A, which is also slotted, as indicated by A' in Fig. 8, to form guides for the upwardly extending edges $9^a$ on the inner end of the brackets which it will be understood are also received in slots provided in the lower surface of the portion B. The edge portions $9^a$ on the brackets not only serve as a projection for guiding the upper edge of the brackets, but they also act as filling pieces for closing the slots A' in the under section A of the table top which would otherwise appear at these points, so that the surface of the latter is level when the desk lid is opened.

The operating connection between the desk lid *a* and the sliding brackets 9 comprise the arms 10 hinged at their inner ends to the screw pins 11, inserted in the upper edges of the brackets, and at their outer ends to hinge leaves 12, which are offset a short distance from the hinges 8, as shown in Figs. 1 and 7. The surfaces of the under portion A and of the leaf portion *a* are slotted or ground as indicated by 13 in Fig. 8, to accommodate the slide operating members 10, so that when the desk lid is open these parts fall below the plane of the desk surface.

A further feature of our invention comprises the association with the mechanism just described of a suitable rack for containing the customary writing materials which normally lies below the level of the table top, but is raised upwardly for convenient access, when the desk lid is open. The receptacle referred to may be located in any desired position, but both for the sake of appearance, convenience in operation and manufacture and accessibility, we prefer to locate it at the center of the table top, and in such a position that when the desk lid is closed the receptacle will be covered and prevented from accumulating dust and its contents thoroughly protected.

In the drawings the receptacle is indicated by C, and may comprise a plurality of compartments suitable for holding writing paper and envelops, and if further desired, an ink well might be mounted therein. The receptacle is supported for vertical movement in guides 14 depending at the ends of the slot in the table top A. The receptacle normally occupies a position below the surface of the table when the desk lid is closed, as shown in Fig. 6, and when the latter is opened, it is elevated or projected upwardly, as shown in Fig. 5, by any suitable mechanism actuated through the movement of the desk lid. One means of accomplishing this vertical movement of the receptacle consists in providing inclined guideways, $9^b$ on the inner or adjacent faces of the brackets 9 with which coöperate laterally extending projections or fingers C' attached to the receptacle C. The guide slots $9^b$ being inclined upwardly and rearwardly and the two brackets 9 moving outwardly simultaneously, as the desk lid *a* is revolved, act upon the pins C' and force the receptacle in an upwardly direction until it reaches the limit of its upward movement when the brackets are fully projected and where it is securely held until the desk lid is closed, which latter action serves to retract the brackets 9 when the inclined cam slots $9^b$ cause the receptacle C to be positively moved downwardly to its normal position.

An article of furniture embodying our invention is particularly adapted to be used as one of the furnishings of rooms of small area, such as hotel bed rooms, where the demands of the service rendered vary, and it is not feasible to provide both the two separate pieces of furniture for which our articles serves.

We claim as our invention:

1. The combination with a table top having an aperture, a leaf hinged to the forward edge of the table and normally covering the aperture and rotatable outwardly to form a desk extension, a sliding bracket for supporting the leaf and operating connections between the leaf and the bracket for projecting and retracting the latter, of a receptacle guided for vertical movement through said aperture and means controlled by the bracket for effecting the vertical adjustment of the receptacle upon the reciprocatory movement of the bracket.

2. The combination with a table top having an aperture, a hinged leaf normally covering the aperture and adjustable to uncover the aperture and to form a desk extension, a pair of sliding brackets movable outwardly to support the leaf in extended position and operating connections between the leaf and brackets, of a receptacle guided beneath the aperture and coöperating cam slots and pins on the brackets and receptacle serving to effect the upward and downward movement of the receptacle.

JOHN H. MILLER.
LOUIS RAAB.

Witnesses to signature of John H. Miller:
ELSIE C. DUFF,
ELIZABETH S. MILLER.

Witnesses to signature of Louis Raab:
G. WILLARD RICH,
RUSSELL B. GRIFFITH.